(12) United States Patent
Zohar et al.

(10) Patent No.: US 7,827,353 B2
(45) Date of Patent: Nov. 2, 2010

(54) SELF HEALING MEMORY

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/808,561

(22) Filed: Mar. 24, 2004

(65) Prior Publication Data

US 2005/0015554 A1 Jan. 20, 2005

Related U.S. Application Data

(63) Continuation-in-part of application No. 10/620,080, filed on Jul. 15, 2003, and a continuation-in-part of application No. 10/620,249, filed on Jul. 15, 2003, now Pat. No. 7,293,156.

(51) Int. Cl.
*G06F 12/00* (2006.01)

(52) U.S. Cl. .............................. 711/119; 711/162; 714/1

(58) Field of Classification Search .................. 711/119
See application file for complete search history.

(56) References Cited

U.S. PATENT DOCUMENTS

| | | | |
|---|---|---|---|
| 5,666,512 A | 9/1997 | Nelson et al. |
| 5,694,576 A | 12/1997 | Yamamoto et al. |
| 5,875,481 A | 2/1999 | Ashton et al. |
| 6,317,815 B1 | 11/2001 | Mayer et al. |
| 6,418,068 B1 | 7/2002 | Raynham |
| 6,434,666 B1 | 8/2002 | Takahashi et al. |
| 6,449,731 B1 | 9/2002 | Frey, Jr. |
| 6,453,404 B1 | 9/2002 | Bereznyi et al. |
| 6,457,102 B1 | 9/2002 | Lambright et al. |
| 6,490,615 B1 | 12/2002 | Dias et al. |
| 6,530,036 B1 | 3/2003 | Frey, Jr. |
| 6,591,335 B1 | 7/2003 | Sade et al. |
| 6,604,171 B1 | 8/2003 | Sade |

(Continued)

OTHER PUBLICATIONS

Microsoft Computer Dictionary, Fifth Edition, 2002, Microsoft Press, pp. 437,489.*

(Continued)

*Primary Examiner*—Christian P Chace
*Assistant Examiner*—Matthew Bradley
(74) *Attorney, Agent, or Firm*—Griffiths & Seaton PLLC

(57) ABSTRACT

A method for managing a data storage system, consisting of configuring a first cache to retrieve data from and store data at a first range of logical addresses (LAs) in a storage device. A second cache is configured to operate like the first cache. The method further includes configuring one or more third caches to retrieve data from and store data at a second range of LAs in the storage device.

The method includes detecting an inability of the second cache to retrieve data from or store data at the first range of LAs. In response to the inability, at least one of the first cache and the one or more third caches are reconfigured to retrieve data from and store at the first range of LAs while continuing to retrieve data from and store at the second range of LAs.

27 Claims, 7 Drawing Sheets

U.S. PATENT DOCUMENTS

| | | | |
|---|---|---|---|
| 6,898,666 B1* | 5/2005 | Henry et al. | 711/114 |
| 2003/0212864 A1* | 11/2003 | Hicken et al. | 711/122 |
| 2004/0059870 A1* | 3/2004 | Ash et al. | 711/119 |
| 2004/0153727 A1* | 8/2004 | Hicken et al. | 714/6 |
| 2005/0021906 A1* | 1/2005 | Nakamura et al. | 711/113 |
| 2005/0182906 A1* | 8/2005 | Chatterjee et al. | 711/144 |

OTHER PUBLICATIONS

D. Karger, et al. Consistent Hashing and Random Trees: Distributed Caching Protocols for Relieving Hot Spots on the World Wide Web. Proceedings of the 29$^{th}$ ACM Symposium on Theory of Computing, pp. 654-663. May 1997.

H. Tang et al. Differentiated Object Placement and Location for Self-Organizing Storage Clusters. Technical Report 2002-32, UCSB, Nov. 2002.

A. Brinkmann et al. Compact. Adaptive Placement Schemes for Non-Uniform Capacities. Proceedings of the 14$^{th}$ ACM Symposium on Parallel Algorithms and Architectures (SPAA). Aug. 2002.

* cited by examiner

SELF HEALING MEMORY

RELATED APPLICATIONS

This application is a continuation-in-part of application Ser. No. 10/620,080, titled "Data Allocation in a Distributed Storage System," and of application Ser. No. 10/620,249, now U.S. Pat. No. 7,293,156, titled "Distributed Independent Cache Memory," both filed 15 Jul. 2003, which are incorporated herein by reference.

FIELD OF THE INVENTION

The present invention relates generally to memory access, and specifically to distributed cache design in data storage systems.

BACKGROUND OF THE INVENTION

The slow access time, of the order of 5-10 ms, for an input/output (IO) transaction performed on a disk has led to the need for a caching system between a host generating the IO transaction and the disk. A cache, a fast access time medium, stores a portion of the data contained in the disk. The IO transaction is first routed to the cache, and if the data required by the transaction exists in the cache, it may be used without accessing the disk.

One goal of an efficient caching system is to achieve a high "hit" ratio, where a high proportion of the data requested by IO transactions already exists in the cache, so that access to the disk is minimized. Other desirable properties of an efficient caching system include scalability, the ability to maintain redundant caches and/or disks, and relatively few overhead management transactions.

U.S. Pat. No. 5,694,576 to Yamamoto, et al., whose disclosure is incorporated herein by reference, describes a method for controlling writing from a cache to a disk by adding record identification information to a write request. The added information enables the cache to decide whether data written to the cache should or should not be written to the disk.

U.S. Pat. No. 6,457,102 to Lambright, et al., whose disclosure is incorporated herein by reference, describes a system for storing data in a cache memory that is divided into a number of separate portions. Exclusive access to each of the portions is provided by software or hardware locks. The system may be used for choosing which data is to be erased from the cache in order to make room for new data.

U.S. Pat. No. 6,434,666 to Takahashi, et al., whose disclosure is incorporated herein by reference, describes a caching system having a plurality of cache memories, and a memory control apparatus that selects the cache memory to be used. The memory control apparatus selects the cache so as to equalize use of the cache memories.

U.S. Pat. No. 6,490,615 to Dias, et al., whose disclosure is incorporated herein by reference, describes a scalable cache having cache nodes for storage servers. On receipt of a read request, the cache nodes serve the request or communicate with each other to cooperatively serve the request.

U.S. Pat. No. 5,666,512 to Nelson, et al., whose disclosure is incorporated herein by reference, describes a data storage system comprising a number of disks which are managed by a memory manager. The memory manager maintains a sufficient quantity of hot spare storage space for reconstructing user data and restoring redundancy in the event that one of the storage disks fails.

U.S. Pat. No. 6,418,068 to Raynham, whose disclosure is incorporated herein by reference, describes a self-healing memory comprising a primary memory cells and a spare memory cell. A detector is able to detect an error in one of the primary memory cells. When an error occurs, a controller maps the memory cell having the error to the spare memory cell.

U.S. Pat. No. 6,449,731 to Frey, Jr., whose disclosure is incorporated herein by reference, describes a method to manage storage of an object in a computer system having more than one management storage process. A memory access request is routed to a first storage management process, which is determined to have failed. The request is then routed to a second storage management process, which implements the request.

U.S. Pat. No. 6,530,036 to Frey, Jr., whose disclosure is incorporated herein by reference, describes a self-healing storage system that uses a proxy storage management process to service memory access requests when a storage management process has failed. The proxy accesses relevant parts of a stored object to service the memory access requests, updating the stored object' information to reflect any changes.

U.S. Pat. No. 6,591,335 to Sade, et al., whose disclosure is incorporated herein by reference, describes a method for managing a cache by providing data from a disk storage area to a first and a second cache memory, where the first and second cache memories contain at least some data that is not stored in the other one of the cache memories. In response to data being modified while stored in the cache memories, the same data is written to both of the cache memories.

U.S. Pat. No. 6,604,171 to Sade, whose disclosure is incorporated herein by reference, describes managing a cache memory by using a first cache memory, copying data from the first cache memory to a second cache memory, and, following copying, using the second cache memory along with the first cache memory.

SUMMARY OF THE INVENTION

In embodiments of the present invention, a data storage system comprises one or more interfaces, one or more mass storage devices which store data at logical addresses (LAs), and a plurality of caches intermediary between the interfaces and storage devices. The data storage system is coupled so that it may be accessed, via the interfaces, for input/output (IO) transactions by one or more hosts. Each interface is adapted to communicate directly with all of the caches. A system manager, typically implemented as one or more manager processing units, monitors, coordinates and manages the activity of the storage system.

Each cache is assigned a range of LAs, so that together the caches cover the complete LA range of the mass storage devices. Redundancy of coverage of the complete LA range is ensured by assigning each LA to two caches, so that each LA is mirrored. The system manager detects if one of the caches ceases to operate correctly, so that the cache is unable to retrieve data from or store data at its assigned range of LAs. The redundancy for the assigned range of LAs covered by the incorrectly operating cache, also herein termed a faulty cache, is thus eliminated. If left unrepaired, loss of redundancy in the caches may result in loss of data that has not yet been permanently stored, so that a mechanism is necessary to automatically restore cache redundancy.

On detection of the incorrect operation, the system manager returns the caches to fully redundant range coverage by reconfiguring the remaining operating caches to cover the faulty cache' assigned range of LAs while continuing to cover their previously assigned ranges. The process thus maintains full range redundancy before and after the occurrence of the incorrect operation, while fully utilizing the capacity of all operating caches in both situations.

After reconfiguring the caches, the system manager may transfer data between the operating caches to recover full redundancy of the data stored (especially data not yet permanently stored) in the caches. The data is transferred to the caches that have been reconfigured. The data transfer thus returns the caches to a fully redundant stored data state.

Each interface uses an LA-cache mapping to determine which caches are used for an IO request from a host. At the interface the IO request is converted to one or more strings of commands comprising indications of LAs to which the commands are directed. For each LA the interface uses its mapping to determine to which of the two available caches the request may be directed. After one of the caches ceases to operate correctly, the system manager generates a replacement LA-cache mapping to comply with the reconfigured caches.

There is therefore provided, according to an embodiment of the present invention, a method for managing a data storage system, including:

configuring a first cache to perform at least one of the operations of retrieving data from and storing data at a first range of logical addresses (LAs) in a storage device;

configuring a second cache to perform at least one of the operations of retrieving data from and storing data at the first range of LAs;

configuring one or more third caches to perform at least one of the operations of retrieving data from and storing data at a second range of LAs in the storage device;

detecting an inability of the second cache to retrieve data from or store data at the first range of LAs; and reconfiguring at least one of the first cache and the one or more third caches to perform at least one of the operations of retrieving data from and storing data at the first range of LAs in response to the inability while continuing to perform at least one of the operations of retrieving data from and storing data at the second range of LAs.

The method typically also includes configuring one or more interfaces to receive input/output (IO) requests from host processors directed to specified LAs and to direct all the IO requests to the caches which have been configured to perform at least one of the operations of retrieving data from and storing data at the specified LAs.

The one or more interfaces may include a mapping between the first and the second and the one or more third caches and the first and second ranges of the LAs, wherein the one or more interfaces are adapted to convert the IO requests to one or more requests and to direct the one or more requests to at least one of the first and the second and the one or more third caches in response to the mapping, wherein detecting the inability may include generating a reconfigured mapping between the first and the one or more third caches and the first and second ranges of the LAs, and directing the one or more requests to at least one of the first and the one or more third caches in response to the reconfigured mapping.

Reconfiguring the at least one of the first cache and the one or more third caches may include processing data in the first cache and the one or more third caches so as to restore the first cache and the one or more third caches to a state of full data redundancy, and processing the data may include classifying data in the first cache into a plurality of data groups.

One of the data groups may include dirty data, and processing the data may include storing the dirty data at the one or more third caches.

Alternatively or additionally, one of the data groups may include dirty data, and processing the data may include storing the dirty data at the storage device.

Typically, reconfiguring the at least one of the first cache and the one or more third caches includes retaining an initial configuration of the first cache.

Reconfiguring the at least one of the first cache and the one or more third caches may include implementing a minimum redistribution of the first and the second ranges among the first cache and the one or more third caches. Implementing the minimum redistribution may include redistributing the first and the second ranges using a consistent hashing function. Alternatively or additionally, implementing the minimum redistribution may include redistributing the first and the second ranges using a random number function.

The method may also include providing a system manager which is adapted to configure the first, second and one or more third caches, to detect the inability, and to reconfigure the at least one of the first cache and the one or more third caches. Providing the system manager typically also includes incorporating one or more manager processing units into at least one of the storage device, the first cache, the second cache, and the one or more third caches, and operating the one or more manager processing units in a cooperative manner.

There is further provided, according to an embodiment of the present invention, a data storage system, including:

a storage device wherein data is stored at logical addresses (LAs);

a first cache which is configured to perform at least one of the operations of retrieving data from and storing data at a first range of LAs in the storage device;

a second cache which is configured to perform at least one of the operations of retrieving data from and storing data at the first range of LAs;

one or more third caches which are configured to perform at least one of the operations of retrieving data from and storing data at a second range of LAs in the storage device; and a system manager which is adapted to detect an inability of the second cache to retrieve data from or store data at the first range of LAs, and which reconfigures at least one of the first cache and the one or more third caches to perform at least one of the operations of retrieving data from and storing data at the first range of LAs in response to the inability while continuing to perform at least one of the operations of retrieving data from and storing data at the second range of LAs.

The storage system may include one or more interfaces which are configured to receive input/output (IO) requests from host processors directed to specified LAs and to direct all the IO requests to the caches which have been configured to perform at least one of the operations of retrieving data from and storing data at the specified LAs.

The one or more interfaces may include a mapping between the first and the second and the one or more third caches and the first and second ranges of the LAs, wherein the one or more interfaces are adapted to convert the IO requests to one or more requests and to direct the one or more requests to at least one of the first and the second and the one or more third caches in response to the mapping, and detecting the inability may include the system manager generating a reconfigured mapping between the first and the one or more third caches and the first and second ranges of the LAs, and directing the one or more requests to at least one of the first and the one or more third caches in response to the reconfigured mapping.

Reconfiguring the at least one of the first cache and the one or more third caches may include the first cache processing data therein and the one or more third caches processing data therein so as to restore the first cache and the one or more third caches to a state of full data redundancy.

Processing the data may include classifying data in the first cache into a plurality of data groups.

Typically, one of the data groups includes dirty data, and processing the data may include storing the dirty data at the one or more third caches.

Alternatively or additionally, one of the data groups may include dirty data, and processing the data may include storing the dirty data at the storage device.

Reconfiguring the at least one of the first cache and the one or more third caches may include the first cache retaining an initial configuration.

Reconfiguring the at least one of the first cache and the one or more third caches may include the system manager implementing a minimum redistribution of the first and the second ranges among the first cache and the one or more third caches.

Implementing the minimum redistribution may include redistributing the first and the second ranges using a consistent hashing function.

Alternatively or additionally, implementing the minimum redistribution may include redistributing the first and the second ranges using a random number function.

The system manager may include one or more manager processing units which are incorporated into at least one of the storage device, the first cache, the second cache, and the one or more third caches, wherein the one or more manager processing units operate in a cooperative manner.

There is further provided, according to an embodiment of the present invention, a storage system, including:

one or more mass storage devices, coupled to store data at respective first ranges of logical addresses (LAs);

a plurality of interim fast-access-time caches, configured to operate independently of one another, each interim fast-access-time cache being assigned a respective second range of the LAs and coupled to receive data from and provide data to the one or more mass storage devices having LAs within the respective second range; and one or more interfaces, which are adapted to receive input/output (IO) requests from host processors directed to specified LAs and to direct all the IO requests to the interim fast-access-time cache to which the specified LAs are assigned.

The mass storage devices typically include one or more disks.

There is further provided, according to an embodiment of the present invention, a method for storing data, including:

storing the data in one or more mass storage devices having respective first ranges of logical addresses (LAs);

assigning to each of a plurality of interim fast-access-time caches, configured to operate independently of one another, a respective second range of the LAs;

coupling the plurality of interim fast-access-time caches to receive data from and provide data to the one or more mass storage devices having LAs within the respective second range;

receiving input/output (IO) requests from host processors directed to specified LAs; and directing all the IO requests to the interim fast-access-time cache to which the specified LAs are assigned.

The mass storage devices typically include one or more disks.

There is further provided, according to an embodiment of the present invention, a system for transferring data to and from one or more mass storage devices which store data at respective first ranges of logical addresses (LAs), including:

a plurality of interim fast-access-time caches, configured to operate independently of one another, each interim fast-access-time cache being assigned a respective second range of the LAs and coupled to receive data from and provide data to the one or more mass storage devices within the respective second range; and one or more interfaces, which are adapted to receive input/output (IO) requests from host processors directed to specified LAs and to direct all the IO requests to the interim fast-access-time cache to which the specified LAs are assigned.

The mass storage devices may include one or more disks.

There is further provided, according to an embodiment of the present invention, a method for transferring data to and from one or more mass storage devices which store data at respective first ranges of logical addresses (LAs), including:

assigning to a plurality of interim fast-access-time caches, configured to operate independently of one another, respective second ranges of the LAs;

coupling the plurality of interim fast-access-time caches to receive data from and provide data to the one or more mass storage nodes having LAs within the respective second ranges;

receiving input/output (IO) requests from host processors directed to specified LAs; and directing all the IO requests to the interim fast-access-time cache to which the specified LAs are assigned.

The mass storage devices may include one or more disks.

The present invention will be more fully understood from the following detailed description of the embodiments thereof, taken together with the drawings, a brief description of which is given below.

DETAILED DESCRIPTION OF EMBODIMENTS

Figure 1:
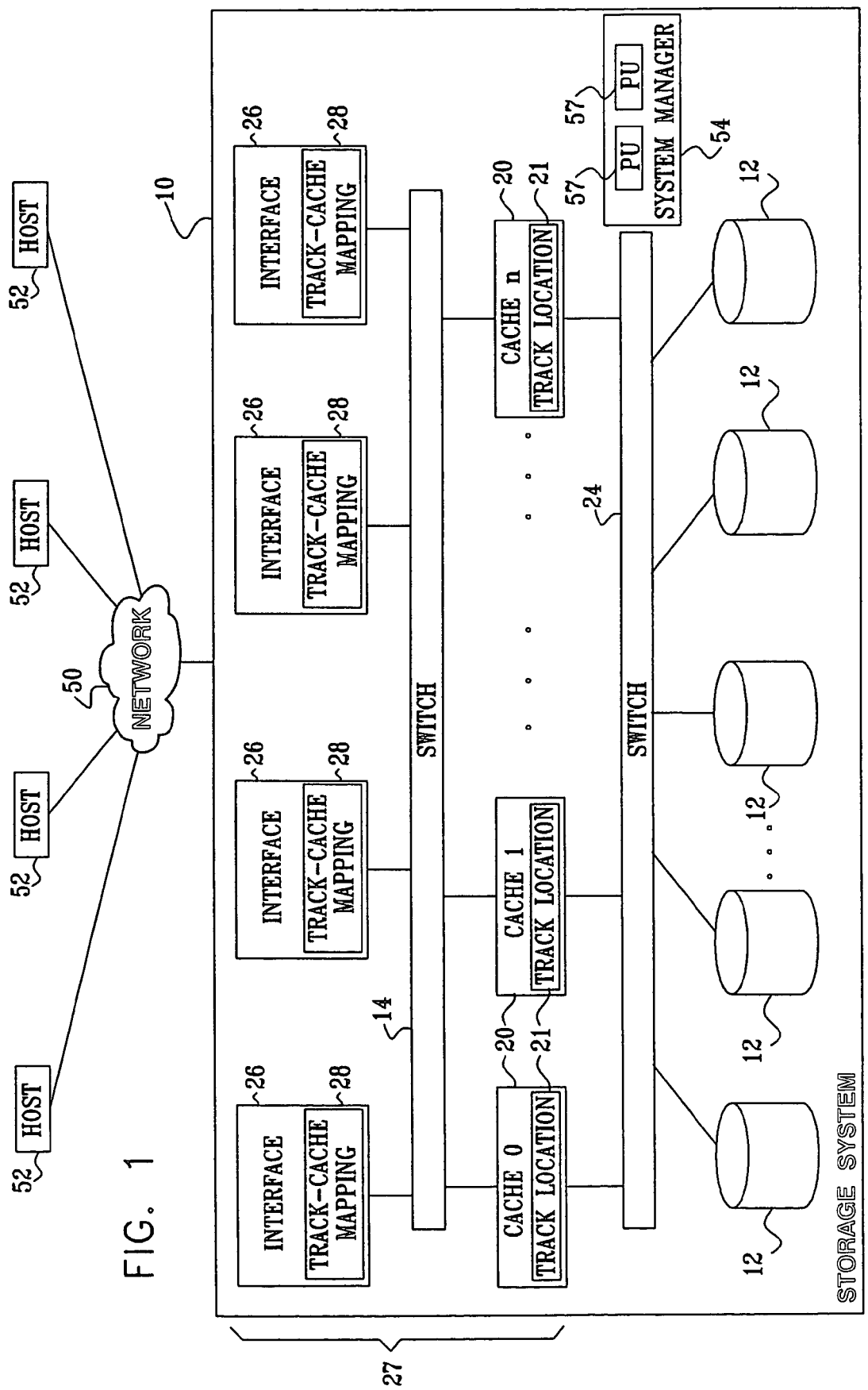
FIG. 1 is a schematic block diagram of a data storage system, according to an embodiment of the present invention.

Reference is now made to FIG. 1, which is a schematic block diagram of a storage system 10, according to an embodiment of the present invention. System 10 acts as a data memory for one or more host processors 52, which are coupled to the storage system by any means known in the art, for example, via a network such as the Internet or by a bus. Herein, by way of example, hosts 52 and system 10 are assumed to be coupled by a network 50. The data stored within system 10 is stored at logical addresses (LAs) in one or more mass storage devices, hereinbelow assumed to be one or more disks 12, by way of example. LAs for system 10 are typically grouped into logical units (LUNs) and both LAs and LUNs are allocated by a system manager 54, which also acts as a control unit for the system. System manager 54 is typically implemented as one or more manager processing units 57, which may be incorporated into disks 12, and/or elements of system 10 described hereinbelow. When implemented as multiple units 57, the units typically control system 10 using a distributed algorithm operated in a cooperative manner.

System 10 comprises one or more substantially similar interfaces 26 which receive input/output (IO) access requests for data in disks 12 from hosts 52. Each interface 26 may be implemented in hardware and/or software, and may be located in storage system 10 or alternatively in any other suitable location, such as an element of network 50 or one of host processors 52. Between disks 12 and the interfaces are a second plurality of interim caches 20, each cache comprising memory having fast access time, and each cache being at an equal level hierarchically. Each cache 20 typically comprises random access memory (RAM), such as dynamic RAM and/or solid state disks, and may also comprise software. Caches 20 are coupled to interfaces 26 by any suitable fast coupling system known in the art, such as a bus or a switch, so that each interface is able to communicate with, and transfer data to and from, any cache. Herein the coupling between caches 20 and interfaces 26 is assumed, by way of example, to be by a first cross-point switch 14. Interfaces 26 operate substantially independently of each other. Caches 20 and interfaces 26 operate as a data transfer system 27, transferring data between hosts 52 and disks 12.

In some embodiments, caches 20 are coupled to disks 12 by a fast coupling system. The coupling between the caches and the disks may be by a "second plurality of caches to first plurality of disks" coupling, herein termed an "all-to-all" coupling, such as a second cross-point switch 24. Alternatively, one or more subsets of the caches may be coupled to one or more subsets of the disks. Further alternatively, the coupling may be by a "one-cache-to-one-disk" coupling, herein termed a "one-to-one" coupling, so that one cache communicates with one disk. The coupling may also be configured as a combination of any of these types of coupling. Disks 12 operate substantially independently of each other.

At setup of system 10 system manager 54 assigns a range of LAs to each cache 20, so that each cache is able to retrieve data from, and/or store data at, its assigned range of LAs. Manager 54 may subsequently reassign the ranges during operation of system, and an example of steps to be taken in the event of a cache change is described below with reference to FIG. 6. The ranges are chosen so that the complete memory address space of disks 12 is covered, and so that each LA is mapped to at least one cache; typically more than one is used for redundancy purposes. The LAs are typically grouped by an internal unit termed a "track," which is a group of sequential LAs, and which is described in more detail below. The assigned ranges for each cache 20 are typically stored in each interface 26 as a substantially similar table, and the table is used by the interfaces in routing IO requests from hosts 52 to the caches. Alternatively or additionally, the assigned ranges for each cache 20 are stored in each interface 26 as a substantially similar function, or by any other suitable method known in the art for generating a correspondence between ranges and caches. Hereinbelow, the correspondence between caches and ranges, in terms of tracks, is referred to as track-cache mapping 28, and it will be understood that mapping 28 gives each interface 26 a general overview of the complete cache address space of system 10.

In arrangements of system 10 comprising an all-to-all configuration, each cache 20 contains a track location table 21 specific to the cache. Each track location table 21 gives its respective cache exact location details, on disks 12, for tracks of the range assigned to the cache. Track location table 21 may be implemented as software, hardware, or a combination of software and hardware. The operations of track location table 21, and also of mapping 28, are explained in more detail below.

Figure 2:
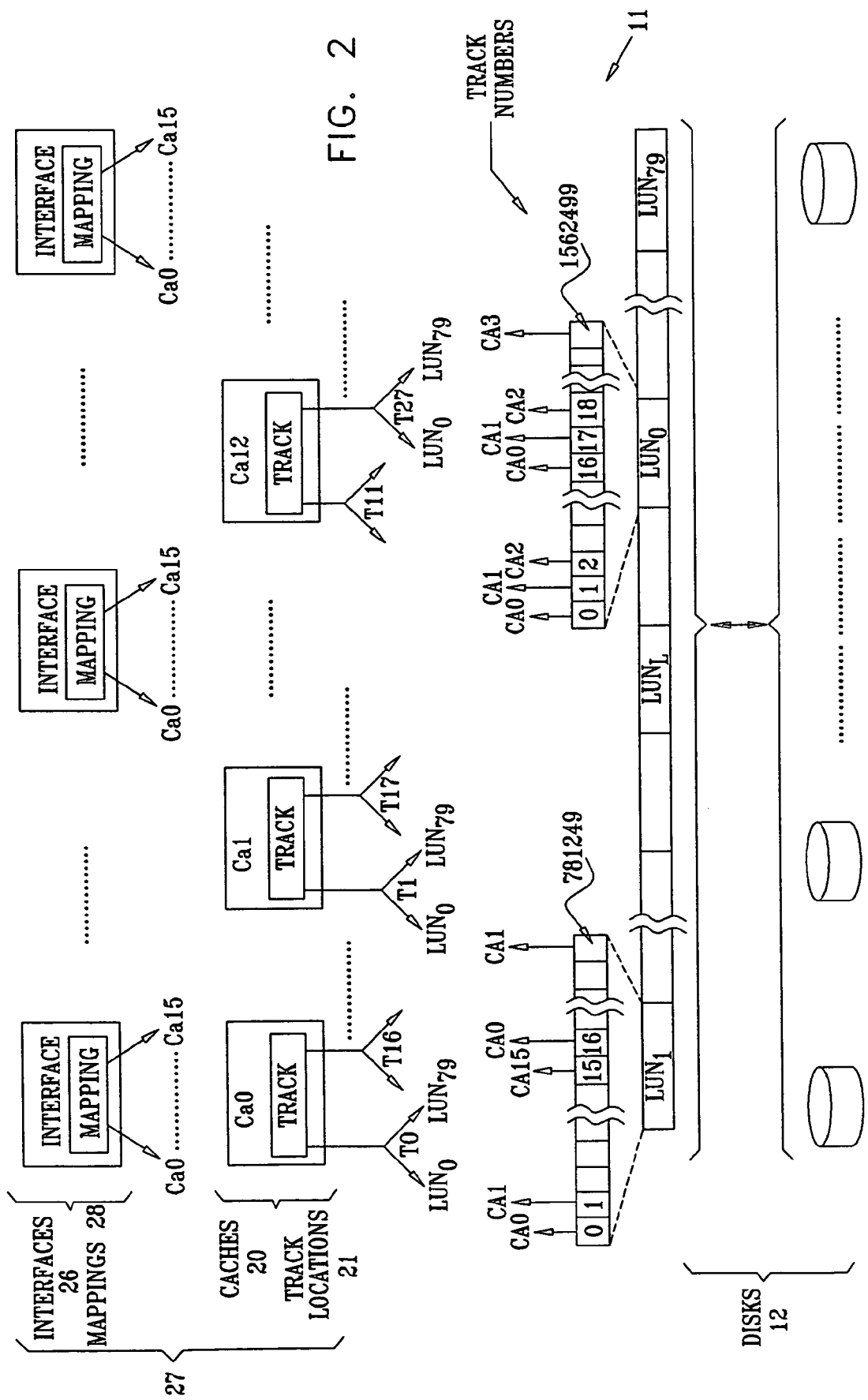
FIG. 2 is a schematic diagram illustrating a mapping of data between different elements of the system of FIG. 1 for an "all-caches-to-all-disks" configuration, according to an embodiment of the present invention.

FIG. 2 is a schematic diagram illustrating a mapping of data between different elements of system 10 when the system comprises an all-to-all configuration 11, according to an embodiment of the present invention. It will be appreciated that host processors 52 may communicate with storage system 10 using virtually any communication system known in the art. By way of example, hereinbelow it is assumed that the hosts communicate with system 10, via network 50, according to an Internet Small Computer System Interface (iSCSI) protocol, wherein blocks of size 512 bytes are transferred between the hosts and the system. The internal unit of data, i.e., the track, is defined by system manager 54 for system 10, and is herein assumed to have a size of 128 iSCSI blocks, i.e., 64 KB, although it will be appreciated that substantially any other convenient size of track may be used to group the data.

Also by way of example, system 10 is assumed to comprise 16 caches 20, herein termed Ca0, Ca1, . . . , Ca(m), . . . , Ca14, Ca15, and 32 generally similar disks 12, each disk having a 250 GB storage capacity, for a total disk storage of 8 TB. It will be understood that there is no requirement that disks 12 have equal capacities, and that the capacities of disks 12 have substantially no effect on the performance of caches 20. The 32 disks are assumed to be partitioned into generally similar LUNs, $LUN_L$, where L is an identifying LUN integer from 0 to 79. The LUNs include $LUN_0$ having a capacity of 100 GB. Each LUN is sub-divided into tracks, so that $LUN_0$ comprises 100 GB/64 KB tracks i.e., 1,562,500 tracks, herein termed Tr0, Tr,1, . . . , Tr1562498, Tr1562499. (Typically, as is described further below, the LAs for any particular LUN may be spread over a number of disks 12, to achieve well-balanced loading for the disks.)

In system 10, each track of $LUN_0$ is assigned to a cache according to the following general mapping:

$$Tr(n) \rightarrow Ca(n \bmod 16) \tag{1}$$

where n is the track number.

Mapping (1) generates the following specific mappings between tracks and caches:

$$Tr(0) \rightarrow Ca(0) \; Tr(1) \rightarrow Ca(1) \ldots Tr(15) \rightarrow Ca(15)$$
$$Tr(16) \rightarrow Ca(0) \; Tr(17) \rightarrow Ca(1) \ldots Tr(1562498)$$
$$\rightarrow Ca(2) \; Tr(1562499) \rightarrow Ca(3) \tag{2}$$

A similar mapping for each LUN comprising disks 12 may be generated. For example, a $LUN_1$ having a capacity of 50 GB is sub-divided into 781,250 tracks, and each track of $LUN_1$ is assigned the following specific mappings:

$$Tr(0) \to Ca(0) \; Tr(1) \to Ca(1) \ldots Tr(15) \to Ca(15)$$
$$Tr(16) \to Ca(0) \; Tr(17) \to Ca(1) \ldots Tr(781248)$$
$$\to Ca(0) \; Tr(781249) \to Ca(1) \quad (3)$$

Inspection of mappings (2) and (3) shows that the tracks of $LUN_0$ and of $LUN_1$ are substantially evenly mapped to caches 20. In general, for any $LUN_L$, a general mapping for every track in disks 12 is given by:

$$Tr(L,n) \to Ca(n \bmod 16) \quad (4)$$

where n is the track number of $LUN_L$.

It will be appreciated that mapping (4) is substantially equivalent to a look-up table, such as Table I below, that assigns specific tracks to specific caches, and that such a look-up table may be stored in each interface in place of the mapping.

TABLE I

| L (LUN identifier) | Track n (Track number) | Cache (0-15) |
|---|---|---|
| 0 | 0 | 0 |
| 0 | 1 | 1 |
| 0 | 2 | 2 |
| 0 | 3 | 3 |
| 0 | 4 | 4 |
| . | . | . |
| . | . | . |
| . | . | . |
| 0 | 15 | 15 |
| 0 | 16 | 0 |
| . | . | . |
| . | . | . |
| . | . | . |
| 0 | 1562498 | 2 |
| 0 | 1562499 | 3 |
| 1 | 0 | 0 |
| 1 | 1 | 1 |
| . | . | . |
| . | . | . |
| . | . | . |
| 1 | 17 | 1 |
| . | . | . |
| . | . | . |
| . | . | . |
| 1 | 781249 | 1 |
| . | . | . |
| . | . | . |
| . | . | . |

Mapping (4) and Table I are examples of correspondences that assign each track comprised in disks 12 to a specific cache. Other examples of such assignments will be apparent to those skilled in the art. While such assignments may always be defined in terms of a look-up table such as Table I, it will be appreciated that any particular assignment may not be defined by a simple function such as mapping (4). For example, an embodiment of the present invention comprises a Table II where each track of each LUN is assigned by randomly or pseudo-randomly choosing a cache between 0 and 15.

TABLE II

| L (LUN identifier) | Track n (Track number) | Cache (0-15) |
|---|---|---|
| 0 | 0 | 11 |
| 0 | 1 | 0 |
| . | . | . |

TABLE II-continued

| L (LUN identifier) | Track n (Track number) | Cache (0-15) |
|---|---|---|
| . | . | . |
| . | . | . |
| . | . | . |
| 0 | 15 | 12 |
| 0 | 16 | 2 |
| . | . | . |
| . | . | . |
| . | . | . |
| 0 | 1562498 | 14 |
| 0 | 1562499 | 13 |
| 1 | 0 | 7 |
| 1 | 1 | 5 |
| . | . | . |
| . | . | . |
| . | . | . |
| 1 | 17 | 12 |
| . | . | . |
| . | . | . |
| . | . | . |
| 1 | 781249 | 15 |
| . | . | . |
| . | . | . |
| . | . | . |

Configurations of system 10 that include an all-to-all configuration such as configuration 11 include track location table 21 in each cache 20 of the all-to-all configuration. Track location table 21 is used by the cache to determine an exact disk location of a requested LUN and track. Table III below is an example of track location table 21 for cache Ca7, assuming that mapping 28 corresponds to Table I. In Table III, the values a, b, . . . , f, . . . of the disk locations of the tracks, are allocated by system manager 54.

TABLE III

Cache Ca7

| L (LUN identifier) | Track n (Track number) | Disk Location |
|---|---|---|
| 0 | 7 | a |
| 0 | 23 | b |
| . | . | . |
| . | . | . |
| . | . | . |
| 0 | 1562487 | c |
| 1 | 7 | d |
| 1 | 23 | e |
| . | . | . |
| . | . | . |
| . | . | . |
| 1 | 1562487 | f |
| . | . | . |
| . | . | . |
| . | . | . |

Figure 3:
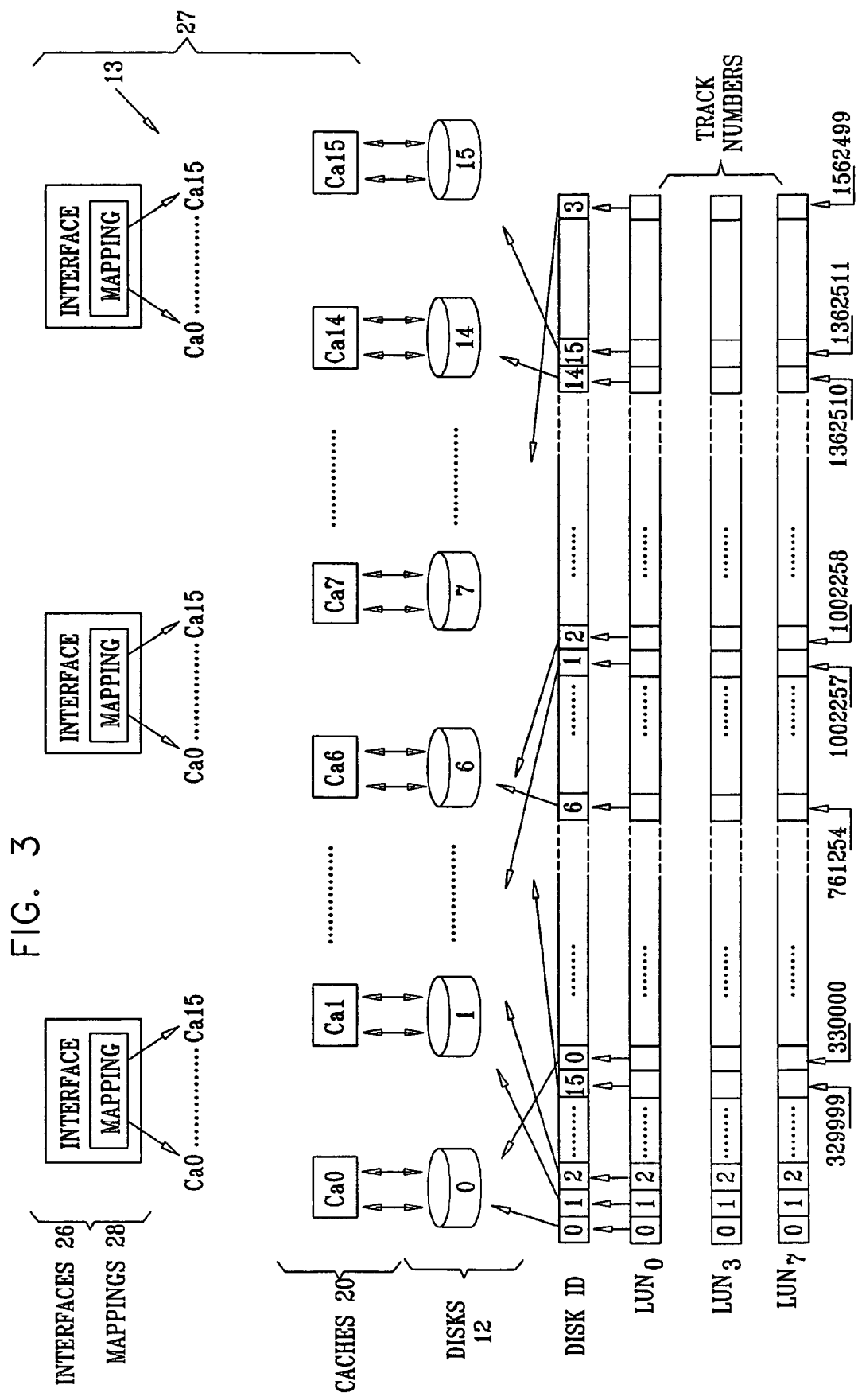
FIG. 3 is a schematic diagram illustrating a mapping of data between different elements of system of FIG. 1 for a "one-cache-to-one-disk" configuration, according to an embodiment of the present invention.

FIG. 3 is a schematic diagram illustrating a mapping of data between different elements of system 10 when the system comprises a one-to-one configuration 13, according to an embodiment of the present invention. In one-to-one configuration 13, tracks are assigned to caches on the basis of the disks wherein the tracks originate. FIG. 3, and Table IV below, shows an example of tracks so assigned. For the assignment of each track of system 10 defined by Table IV, there are assumed to be 16 generally similar disks 12, each disk having a whole number disk identifier D ranging from 0 to 15 and 50 GB capacity, and each disk is assigned a cache. There are also assumed to be 8 LUNs $LUN_L$, where L is an integer from 0 to 7, of 100 GB evenly divided between the disks, according to mapping (5):

$$Tr(L,n) \rightarrow Disk(n \bmod 16) = Ca(n \bmod 16) \quad (5)$$

TABLE IV

| L (LUN identifier) | n (Track number) | D (Disk identifier) (0-15) | Cache (0-15) |
|---|---|---|---|
| 0-7 | 0 | 0 | 0 |
| | 1 | 1 | 1 |
| | 2 | 2 | 2 |
| | . | . | . |
| | . | . | . |
| | 329999 | 15 | 15 |
| | 330000 | 0 | 0 |
| | . | . | . |
| | . | . | . |
| | 761254 | 6 | 6 |
| | . | . | . |
| | . | . | . |
| | 1002257 | 1 | 1 |
| | 1002258 | 2 | 2 |
| | . | . | . |
| | . | . | . |
| | 1562499 | 3 | 3 |

A mapping such as mapping (4) or mapping (5), or a table such as Table I, II, or IV, or a combination of such types of mapping and tables, is incorporated into each interface 26 as its track-cache mapping 28, and spreads the LAs of the LUNs substantially evenly across caches 20. The mapping used is a function of the coupling arrangement between caches 20 and disks 12. Track-cache mapping 28 is used by the interfaces to process IO requests from hosts 52, as is explained with respect to FIG. 5 below. The application titled "Data Allocation in a Distributed Storage System," describes a system for mapping LAs to devices such as caches 20 and/or disks 12, and such a system may be used for generating track-cache mapping 28.

To achieve well-balanced loading across caches 20, system 10 generates even and sufficiently fine "spreading" of all the LAs over the caches, and it will be appreciated that track-cache mapping 28 enables system 10 to implement the even and fine spread, and thus the well-balanced loading. For example, if in all-to-all configuration 11, or in one-to-one configuration 13, caches 20 comprise substantially equal capacities, it will be apparent that well-balanced loading occurs. Thus, referring back to mapping (1), statistical considerations make it clear that the average IO transaction related with the LAs of $LUN_0$ is likely to use evenly all the 16 caches available in the system, rather than anyone of them, or any subset of them, in particular. This is because $LUN_0$ contains about 1.5 million tracks, and these tracks are now spread uniformly and finely across all 16 caches, thus yielding a well-balanced load for the IO activity pertaining to the caches, as may be true in general for any system where the number of tracks is far greater than the number of caches. Similarly, spreading LAs evenly and sufficiently finely amongst disks 12 leads to well-balanced IO activity for the disks.

An example of a configuration with unequal cache capacities is described with reference to FIG. 4.

Figure 4:
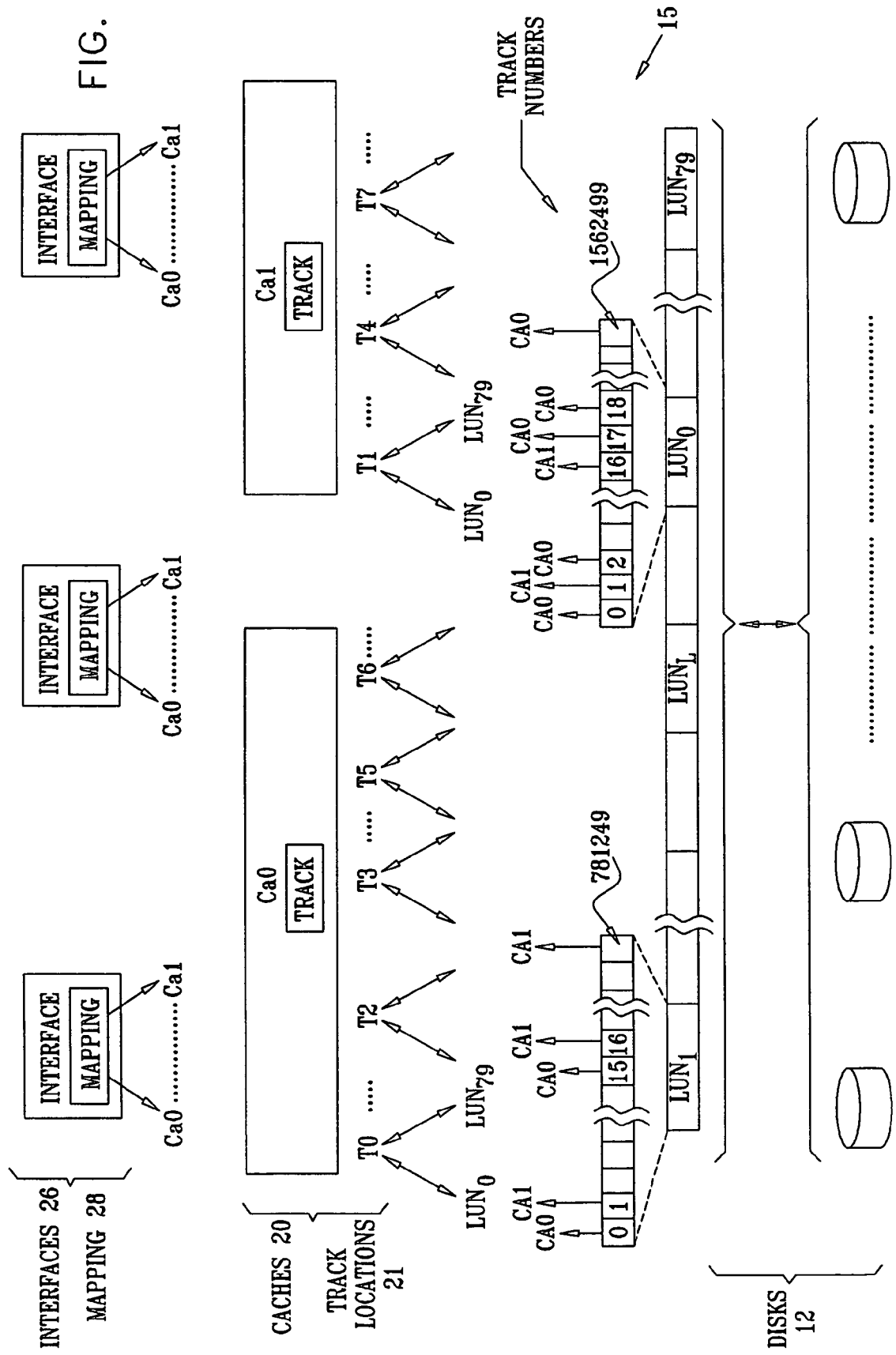
FIG. 4 is a schematic diagram illustrating a mapping of data between different elements of the system of FIG. 1 for an alternative "all-caches-to-all-disks" configuration, according to an embodiment of the present invention.

FIG. 4 is a schematic diagram illustrating a mapping of data between different elements of system 10 when the system comprises an alternative all-to-all configuration 15, according to an embodiment of the present invention. Apart from the differences described below, configuration 15 is generally similar to configuration 11, so that elements indicated by the same reference numerals in both configurations are generally identical in construction and in operation. All-to-all configuration 15 comprises two caches 20, herein termed Ca0 and Ca1, Ca0 having approximately twice the capacity of Ca1.

Track-cache mapping 28 is implemented as mapping (6) below, or as Table V below, which is derived from mapping (6).

$$Tr(L,n) \rightarrow Ca[(n \bmod 3) \bmod 2] \quad (6)$$

where n is the track number of $LUN_L$.

TABLE V

| L (LUN identifier) | n (Track number) | Cache (0-1) |
|---|---|---|
| 0 | 0 | 0 |
| 0 | 1 | 1 |
| 0 | 2 | 0 |
| 0 | 3 | 0 |
| 0 | 4 | 1 |
| 0 | 5 | 0 |
| 0 | 6 | 0 |
| . | . | . |
| . | . | . |
| 0 | 15 | 0 |
| 0 | 16 | 1 |
| 0 | 17 | 0 |
| 0 | 18 | 0 |
| . | . | . |
| 0 | 1562499 | 0 |
| 1 | 0 | 0 |
| 1 | 1 | 1 |
| . | . | . |
| 1 | 15 | 0 |
| 1 | 16 | 1 |
| 1 | 17 | 0 |
| . | . | . |
| 1 | 781249 | 1 |
| . | . | . |

Mapping 28 is configured to accommodate the unequal capacities of Ca0 and Ca1 so that well-balanced loading of configuration 15 occurs.

By inspection of the exemplary mappings for configurations 11, 13, and 15, it will be appreciated that mapping 28 may be configured to accommodate caches 20 in system 10 having substantially any capacities, so as to maintain substantially well-balanced loading for the system. It will also be appreciated that the loading generated by mapping 28 is substantially independent of the capacity of any specific disk in system 10, since the mapping relates caches to tracks.

Figure 5:
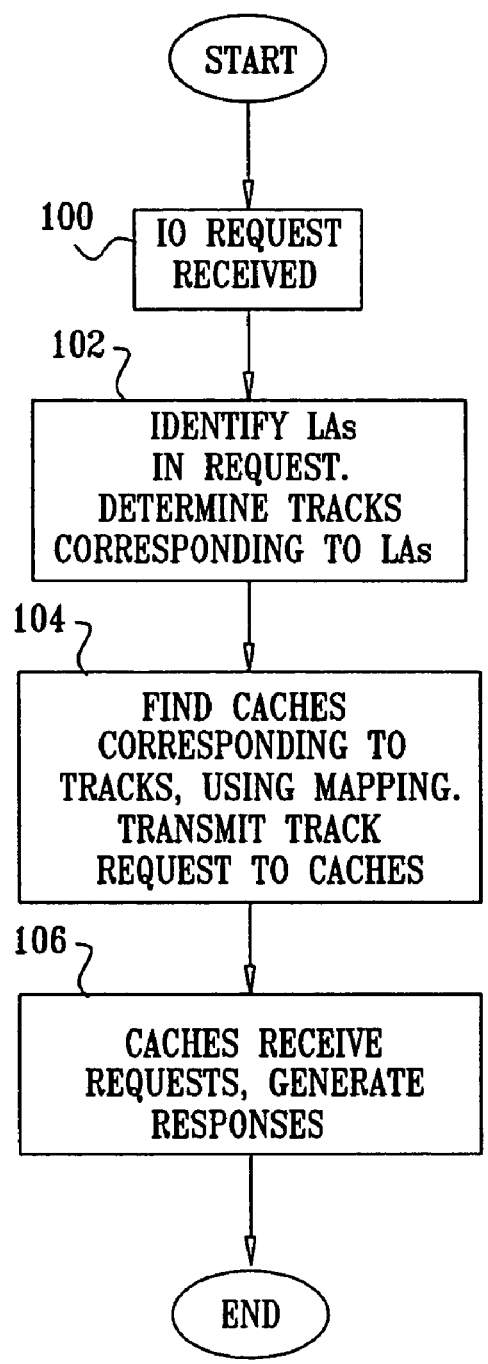
FIG. 5 is a flow chart showing steps followed by the system of FIG. 1 on receipt of an input/output request from a host communicating with the system, according to an embodiment of the present invention.

FIG. 5 is a flow chart showing steps followed by system 10 on receipt of an IO request from one of hosts 52, according to an embodiment of the present invention. Each IO request from a specific host 52 comprises several parameters, such as whether the request is a read or a write command, the LUN to which the request is addressed, the first LA requested, and a number of blocks of data included in the request.

In an initial step 100, the IO request is transmitted to system 10 in one or more packets according to the protocol under which the hosts and the system are operating. The request is received by system 10 at one of interfaces 26, herein, for clarity, termed the request-receiving interface (RRI).

In a track identification step 102, the RRI identifies from the request the LAs from which data is to be read from, or to which data is to be written to. The RRI then determines one or more tracks corresponding to the LAs which have been identified.

In a cache identification step 104, the RRI refers to its mapping 28 to determine the caches corresponding to tracks determined in the third step. For each track so determined, the RRI transfers a respective track request to the cache corresponding to the track. It will be understood that each track request is a read or a write command, according to the originating IO request.

In a cache response 106, each cache 20 receiving a track request from the RRI responds to the request. The response is a function of, inter alia, the type of request, i.e., whether the track request is a read or a write command and whether the request is a "hit" or a "miss." Thus, data may be written to the LA of the track request from the cache and/or read from the LA to the cache. Data may also be written to the RRI from the cache and/or read from the RRI to the cache. If system 10 comprises an all-to-all configuration, and the response includes writing to or reading from the LA, the cache uses its track location table 21 to determine the location on the corresponding disk of the track for the LA.

The flow chart of FIG. 5 illustrates that there is virtually no management activity of system 10 once an IO request has reached a specific interface 26. This is because the only activity performed by the interface is, as described above for steps 102 and 104, identifying track requests and transmitting the track requests to their respective caches 20. Similarly, each cache 20 operates substantially independently, since once a track request reaches its cache, data is moved between the cache and the interface originating the request, and between the cache and the required disk, as necessary, to service the request.

Figure 6:
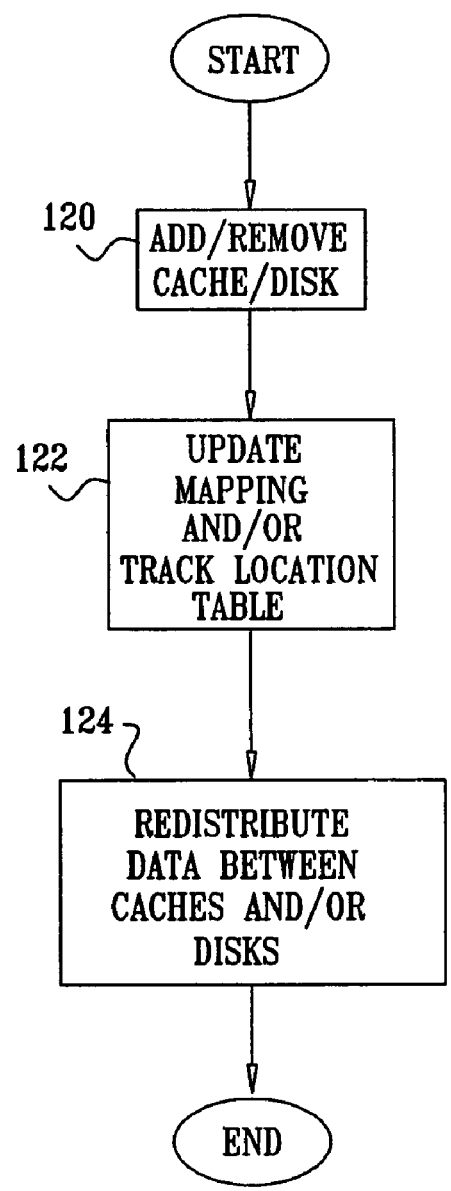
FIG. 6 is a flow chart showing steps followed by the system of FIG. 1 on addition or removal of a cache or disk from the system, according to an embodiment of the present invention.

FIG. 6 is a flow chart showing steps followed by system 10 on addition or removal of a cache or disk from system 10, according to an embodiment of the present invention. In a first step 120, a cache or disk is added or removed from system 10. In an update step 122, system manager 54 updates mapping 28 and/or track location table 21 to reflect the change in system 10. In a redistribution step 124, system manager 54 redistributes data on disks 12, if the change has been a disk change, or data between caches 20, if the change is a cache change. The redistribution is according to the updated mapping 28, and it will be understood that the number of internal IO transactions generated for the redistribution is dependent on changes effected in mapping 28. Once redistribution is complete, system 10 then proceeds to operate as described with reference to FIG. 4. It will thus be apparent that system 10 is substantially perfectly scalable.

Referring back to FIGS. 1, 2, and 3, redundancy for caches 20 and/or disks 12 may be easily incorporated into system 10. The redundancy may be implemented by modifying track-cache mapping 28 and/or track location table 21, so that data is written to more than one cache 20, and may be read from any of the caches, and also so that data is stored on more than one disk 12.

Mapping (7) below is an example of a mapping, similar to mapping (4), that assigns each track to two caches 20 of the 16 caches available, so that incorporating mapping (7) as track-cache mapping 28 in each interface 26 will form a redundant cache for each cache of system 10.

$$Tr(L, n) \rightarrow \begin{cases} Ca(n \bmod 8) \\ Ca(8 + n \bmod 8) \end{cases} \quad (7)$$

where n is the track number of $LUN_L$.

In processing an IO request, as described above with reference to FIG. 5, the interface 26 that receives the IO request may generate a track request (cache identification step 104) to either cache defined by mapping (7).

Table below is an example of a table for cache Ca7, similar to Table III above, that assumes each track is written to two separate disks 12, thus incorporating disk redundancy into system 10. The specific disk locations for each track are assigned by system manager 54. A table similar to Table VI is incorporated as track location table 21 into each respective cache 20.

TABLE VI

| Cache Ca7 | | |
|---|---|---|
| Track | | |
| L (LUN identifier) | n (Track number) | Disk Location |
| 0 | 7 | a1, a2 |
| 0 | 23 | b1, b2 |
| . | . | . |
| . | . | . |
| . | . | . |
| 0 | 1562487 | c1, c2 |
| 1 | 7 | d1, d2 |
| 1 | 23 | e1, e2 |
| . | . | . |
| . | . | . |
| . | . | . |
| 1 | 1562487 | f1, f2 |
| . | . | . |
| . | . | . |
| . | . | . |

As described above with reference to cache response step 106 (FIG. 5), the cache that receives a specific track request may need to refer to track location table 21. This reference generates a read or a write, so that in the case of Table VI, the read may be to either disk assigned to the specific track, and the write is to both disks.

It will be appreciated that other forms of redundancy known in the art, apart from those described above, may be incorporated into system 10. For example, a write command to a cache may be considered to be incomplete until the command has also been performed on another cache. All such forms of redundancy are assumed to be comprised within the present invention.

Figure 7:
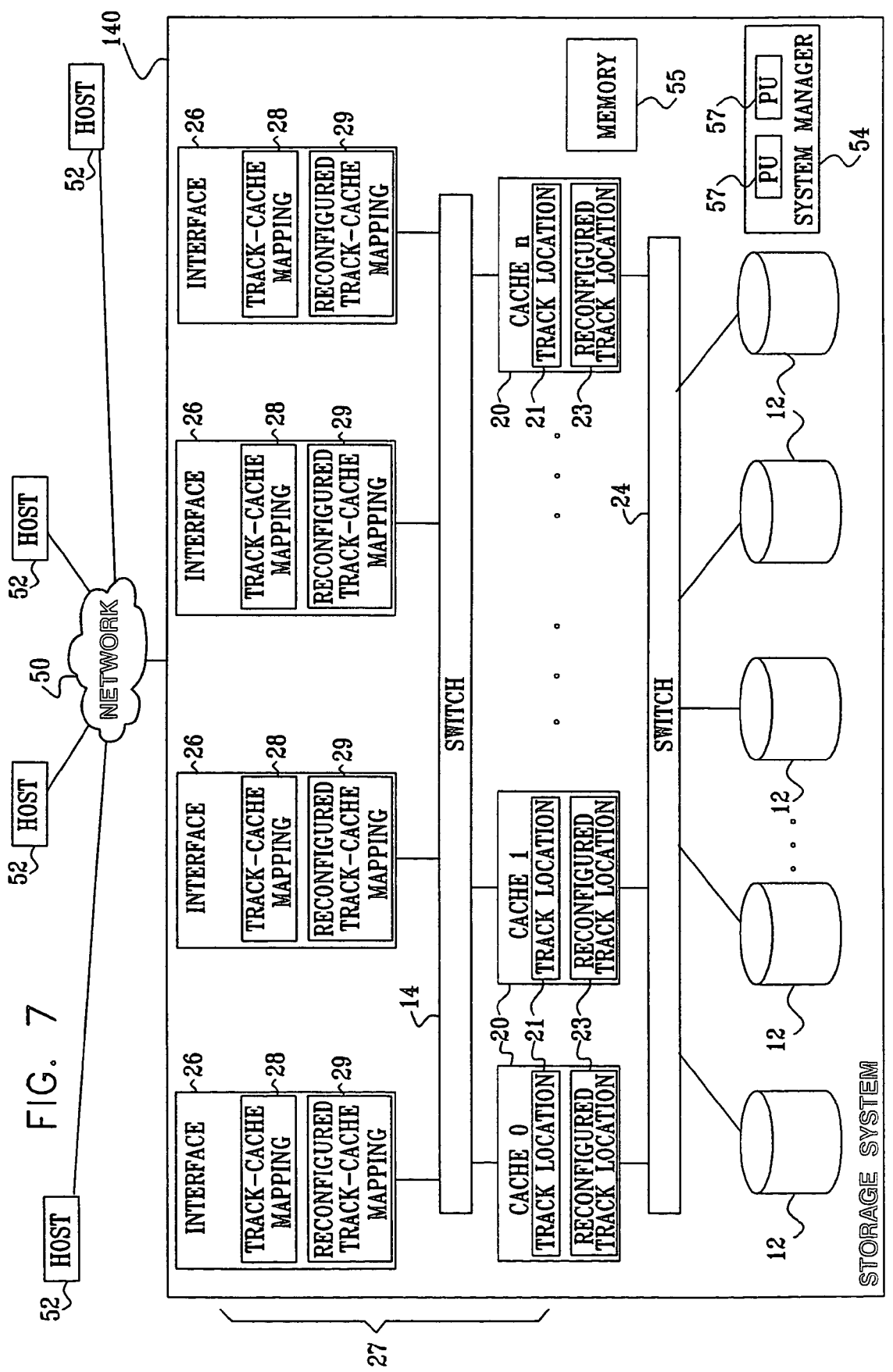
FIG. 7 is a schematic block diagram of a storage system comprising redundant caches, according to an embodiment of the present invention.
Figure 8:
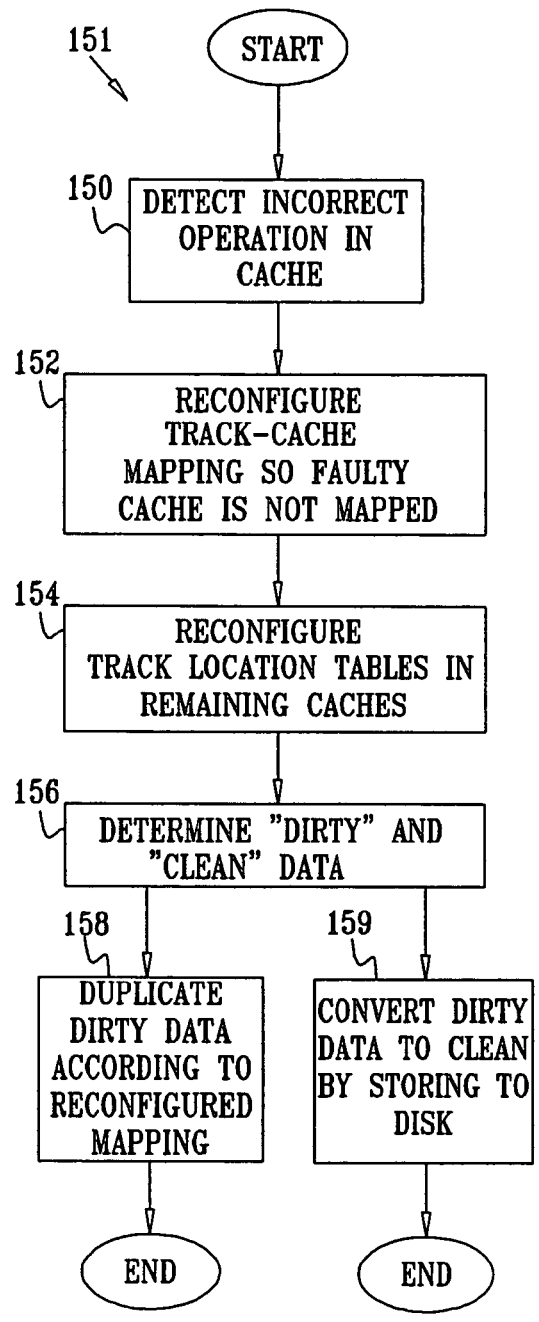
FIG. 8 is a flowchart showing steps performed when one of the redundant caches of the system of FIG. 7 becomes inoperative, according to an embodiment of the present invention.

FIG. 7 is a schematic block diagram of a storage system 140 comprising redundant caches, and FIG. 8 is a flowchart 151 showing steps performed when one of the redundant caches becomes inoperative, according to embodiments of the present invention. Apart from the differences described below, the operation of system 140 is generally similar to that of system 10 (FIG. 1), such that elements indicated by the same reference numerals in both systems 140 and 10 are generally identical in construction and in operation. System 140 is typically configured to have redundant disks 12.

In system 140 each cache 20 is assumed to operate independently, so that failure or removal of one of the caches, or other action or fault causing the cache to become inoperative, has substantially no effect on the operation of the other caches. System 140 is further assumed to incorporate redundant caches, so that the data and ranges of each cache 20 are mirrored in one or more other caches.

By way of example, data and range redundancy of caches 20 is assumed to be implemented using mapping (4). Thus, mapping 28 corresponds to mapping (4), so that Ca0 mirrors Ca8, Ca1 mirrors Ca9, . . . , and Ca7 mirrors Ca15. It will be understood that in this example track location tables 21 of caches that are mirrors of each other are substantially identical. It will also be understood that in a more general case data and ranges of any specific cache 20 may be mirrored in more than one other cache 20. Those skilled in the art will be able to adapt the example herein, wherein each cache 20 mirrors another cache 20, to the more general case.

In the following description, by way of example Ca4 is assumed to begin to operate incorrectly, so that it is unable to retrieve data from or store data at its assigned ranges of LAs, or otherwise functions incorrectly. Thus data stored in Ca12, and ranges of LAs assigned to Ca12, may no longer be fully and/or correctly mirrored.

In a first step 150 of flowchart 151, system manager 54 detects that Ca4 has begun to operate incorrectly.

System manager 54 employs any method known in the art to monitor the operation of caches 20, such as monitoring parity bits or cyclic redundancy checksum (CRC) values of data transmitted to the caches, in order to detect faults and/or incorrect operation of the caches. It will be understood that incorrect operation may also be caused by loss of power to a cache, removal of the cache from system 140, or another event, known to those skilled in the art, interfering with the normal operation of the cache.

In a second step 152 of the flowchart, manager 54 reconfigures mapping 28 in every interface 26.

The reconfiguration is made so that each track initially mapped to Ca4 is mapped to a cache different from both Ca4 and Ca12; tracks that mapping 28 maps to caches other than Ca4 may continue to be mapped unchanged. The reconfigured mapping is herein termed a mapping 29, and mapping 29 may be any suitable mapping that does not map to Ca4. Typically, mapping 29 maps all tracks that were mapped to Ca4 evenly over caches other than Ca4 and Ca12, and involves a minimal rearrangement of track mapping in proceeding from mapping 28 to mapping 29. Depending on the type of mapping used, manager 54 stores mapping 29 as a table and/or as a function in each interface 26.

Examples of suitable mappings 29 are described in more detail below.

In a third step 154, manager 54 reconfigures track location tables 21 in each cache 20.

The reconfigured tables, herein termed track location tables 23, reflect the changes incorporated in storage system 140 by changing from mapping 28 to mapping 29. Thus, for future IO access requests after Ca4 begins to operate incorrectly, interfaces 26 use mapping 29 to determine to which caches 20 the future requests are to be directed, and caches 20 use track location tables 23 to locate the tracks.

The incorrect operation of Ca4 means that existing data in Ca12, generated by mapping 28, is not mirrored in Ca4. This data will be one of two kinds:

"clean" data, which is data that has been stored in disks 12, by storage transactions that have completed; and "dirty" data, which is data that has not been stored in disks 12, since storage transactions involving this type have not completed.

In a fourth step 156, manager 54 evaluates the existing data in Ca12 to determine which data is dirty and which data is clean. Manager 54 operates on the dirty data according to one of two alternative methods. In a first method, in a fifth step 158, manager 54 applies mapping 29 to the dirty data in Ca12. The manager duplicates the dirty data to one or more other caches 20 according to the mapping, by removing some of the existing clean data in the one or more other caches 20. Typically, system manager 54 operates a caching policy to determine which data is to be stored and which data is to be removed from a cache. For example, the caching policy may comprise a least recently used (LRU) algorithm, wherein LRU data is the data that is "written over" in favor of new data being written to the cache. Other caching policies are known in the art. The caching policy operated by manager 54 most preferably includes decision mechanisms enabling the manager to decide which of the existing clean data in the one or more other caches 20 is to be duplicated.

In a second method, in an alternative fifth step 159, manager 54 converts the dirty data in Ca12 to clean data, by storing the data to disks 12.

Whichever fifth step is used, manager 54 most preferably assigns a high priority to the process involved in the step, so that the lack of redundancy caused by the incorrect operation of Ca4 is remedied as quickly as possible.

Implementation of either step 158 or step 159 returns system 140 to a state of full data redundancy, since after the steps have completed two copies of the data operated on either exist in a cache 20 and a disk 12, or in two caches 20.

After completion of step 158 or step 159, flowchart 151 ends.

Some embodiments of the present invention may use a combination of both methods described with reference to steps 158 and 159. For example, manager 54 may place the dirty data of Ca12 on a bus, or in switch 24, so that the cache 20 to which the dirty data is to be copied, and the disk 12 at which the data is to be stored have simultaneous access.

Flowchart 151 illustrates a process for recovering redundancy for dirty data, on incorrect operation of a cache 20. Classifications of data stored in caches into data groups other than clean and dirty are known in the art, such as "hot" data, typically data that is considered to be in high demand. Those skilled in the art will be able to apply the principles of flowchart 151, mutatis mutandis, to recovering redundancy for clean data, as well as for the other classifications such as hot data.

Examples of mapping 29 that may be used in embodiments of the present invention are mapping (8) and mapping (9):

$$(n \bmod 8) \neq 4, Tr(L, n) \to \begin{cases} Ca(n \bmod 8) \\ Ca(8 + n \bmod 8) \end{cases} \quad (8)$$

$$(n \bmod 8) = 4, Tr(L, n) \to \begin{cases} Ca(R_n) \\ Ca(12) \end{cases}$$

where $n$ is the track number of $LUN_L$, and where $R_n$ is a random number for each $n$, chosen from {0, 1, 2, 3, 5, 6, 7, 8, 9, 10, 11, 13, 14, 15}.

$$(n \bmod 8) \ne 4, Tr(L, n) \to \begin{cases} Ca(n \bmod 8) \\ Ca(8 + n \bmod 8) \end{cases} \quad (9)$$

$$(n \bmod 8) = 4 \text{ and } (n \bmod 112) = 4, Tr(L, n) \to \begin{cases} Ca(0) \\ Ca(12) \end{cases}$$

$$(n \bmod 8) = 4 \text{ and } (n \bmod 112) = 12, Tr(L, n) \to \begin{cases} Ca(1) \\ Ca(12) \end{cases}$$

$$(n \bmod 8) = 4 \text{ and } (n \bmod 112) = 20, Tr(L, n) \to \begin{cases} Ca(2) \\ Ca(12) \end{cases}$$

$$(n \bmod 8) = 4 \text{ and } (n \bmod 112) = 28, Tr(L, n) \to \begin{cases} Ca(3) \\ Ca(12) \end{cases}$$

$$(n \bmod 8) = 4 \text{ and } (n \bmod 112) = 36, Tr(L, n) \to \begin{cases} Ca(5) \\ Ca(12) \end{cases}$$

$$(n \bmod 8) = 4 \text{ and } (n \bmod 112) = 44, Tr(L, n) \to \begin{cases} Ca(6) \\ Ca(12) \end{cases}$$

$$\vdots$$

$$(n \bmod 8) = 4 \text{ and } (n \bmod 112) = 84, Tr(L, n) \to \begin{cases} Ca(11) \\ Ca(12) \end{cases}$$

$$(n \bmod 8) = 4 \text{ and } (n \bmod 112) = 92, Tr(L, n) \to \begin{cases} Ca(13) \\ Ca(12) \end{cases}$$

$$(n \bmod 8) = 4 \text{ and } (n \bmod 112) = 100, Tr(L, n) \to \begin{cases} Ca(14) \\ Ca(12) \end{cases}$$

$$(n \bmod 8) = 4 \text{ and } (n \bmod 112) = 108, Tr(L, n) \to \begin{cases} Ca(15) \\ Ca(12) \end{cases}$$

where n is the track number of $LUN_L$.

Mappings (8) and (9) maintain the mapping of mapping 28 for Ca12 unchanged. The mappings distribute the mapping of Ca4 over all caches 20 other than Ca4 and Ca12 by adding mappings to mapping 28. Manager 54 typically implements mapping (8) by generating a corresponding look-up table relating n and the cache 20 to which track n is directed. Manager 54 may implement mapping (9) either by a look-up table, or by software representing the mapping stored in a memory 55 in system 140.

Figure 9:
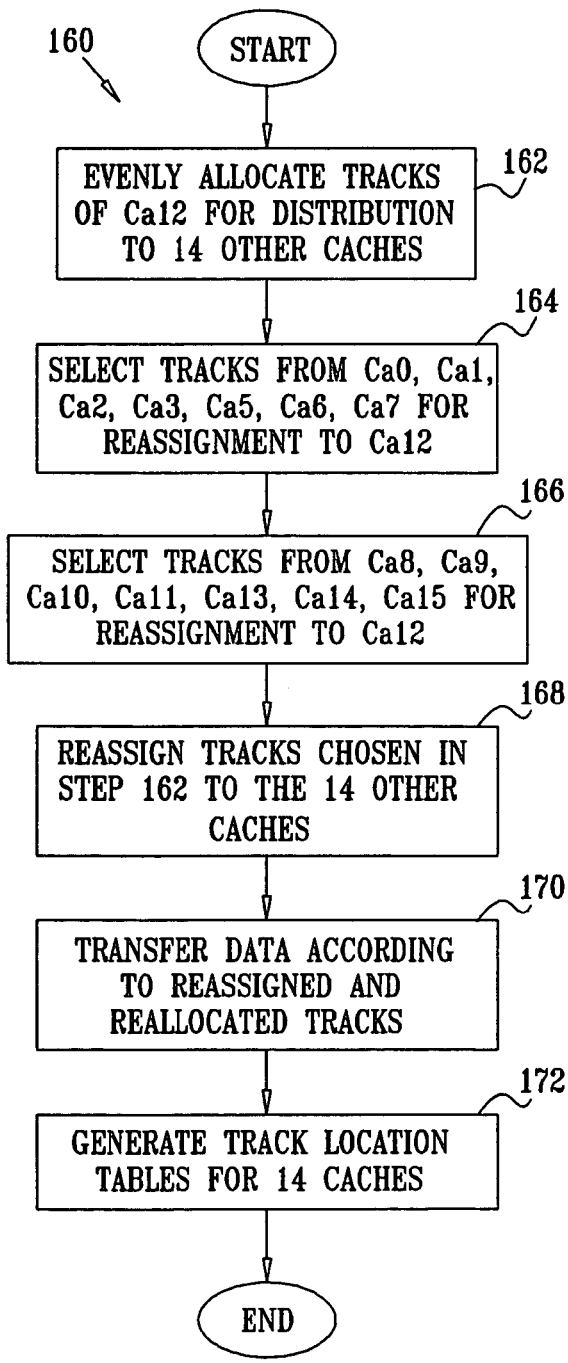
FIG. 9 is a flowchart showing steps followed by a manager of the storage system of FIG. 7 in implementing a mapping of the system, according to an alternative embodiment of the present invention.

FIG. 9 is a flowchart 160 showing steps followed by manager 54 in implementing mapping 29, according to an alternative embodiment of the present invention. Flowchart 160 assumes that Ca4 is no longer operational, and mapping 29 and the track location tables 23 of caches 20 apart from Ca4 are reconfigured so that even loading of caches 20 (apart from Ca4) results. Flowchart 160 further assumes that each cache 20 has an equal capacity and has been allocated an equal number of x tracks before Ca4 ceases to operate.

In a first step 162, manager 54 evenly allocates the x tracks of Ca12 for distribution to the 14 other operational caches 20, so as to recover redundancy for Ca12. For each cache 20, manager 54 randomly selects $$\frac{x}{14}$$

different tracks of those allocated to Ca12.

In a second step 164, manager 54 selects tracks from Ca0, Ca1, Ca2, Ca3, Ca5, Ca6, and Ca7 that are to be transferred from these caches to Ca12, so as to maintain even distribution of tracks. From each of Ca0, Ca1, Ca2, Ca3, Ca5, Ca6, and Ca7, manager 54 randomly reassigns $$\frac{x}{210}$$

tracks to Ca12.

In a third step 166, manager 54 selects tracks from Ca8, Ca9, Ca10, Ca11, Ca13, Ca14, and Ca15 that are to be transferred to Ca12. From each of Ca8, Ca9, Ca10, Ca11, Ca13, Ca14, and Ca15 manager 54 randomly reassigns $$\frac{x}{210}$$

tracks, respectively different from those chosen for Ca0, Ca1, Ca2, Ca3, Ca5, Ca6, and Ca7 in step 164, to Ca12.

In a fourth step 168, manager 54 reassigns the tracks chosen in step 162 to the 14 other operational caches. The reassigned tracks in steps 164, 166, and 168 form mapping 29.

In a fifth step 170, manager 54 transfers data between the 15 operational caches 20 according to mapping 29, and according to any caching policy implemented by the manager.

In a final step 172, track location tables 23 for each operational cache 20 (apart from Ca4 and Ca12) are generated according to mapping 29.

At the conclusion of flowchart 160, each of the 15 operational caches 20 has been assigned an equal number, $$\frac{16x}{15},$$

of tracks, and stores data according to these tracks. All of the tracks and the data assigned to the tracks, including all tracks and data of Ca12, are mirrored. The track reconfiguration implemented by flowchart 160 thus achieves well balanced loading on a track allocation basis of the remaining operational caches, while performing the minimum number of track reassignments to accomplish the reconfiguration. Those skilled in the art will be able to adapt the steps of flowchart 160, mutatis mutandis, to accommodate situations where caches 20 comprise unequal capacities, as well as situations where the capacity is measured in terms of memory space and/or cache throughput, in order to achieve well balanced loading and a minimum number of track reassignments.

Some of the methods described above for generating mapping 29 have used random numbers. Rather than using random numbers, similar methods to those above, mutatis mutandis, may use a consistent hashing function. Such functions and their use are described in more detail in application Ser. No. 10/620,080. Those skilled in the art will be able to adapt the methods described above, that use random numbers, to use consistent hashing functions so as to achieve well balanced cache loading and a minimum number of track reassignments. All such methods are assumed to be comprised within the scope of the present invention.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for managing a data storage system, comprising:
   configuring a first cache to perform at least one of the operations of retrieving data from and storing data at a first range of logical addresses (LAs) in a storage device;
   configuring a second cache to perform at least one of the operations of retrieving data from and storing data at a second range of LAs and redundantly storing the data in the first range of LAs;
   configuring the first cache to redundantly store the data in the second range of LAs;
   configuring a plurality of caches to perform at least one of the operations of retrieving data from and storing data at a remaining range of LAs in the storage device and redundantly storing the data in the remaining range of LAs among the plurality of caches;
   mapping the first range of LAs, the second range of LAs, and the remaining range of LAs in a first map;
   detecting that the second cache is inoperable;
   reconfiguring the plurality of caches to perform the at least one of the operations of retrieving data from and storing data at the second range of LAs in response to the inoperability while continuing to perform at least one of the operations of retrieving data from and storing data at the remaining range of LAs;
   reconfiguring the plurality of caches to redundantly store the data in the first range of LAs in response to the inoperability while continuing to perform at least one of the operations of retrieving data from and storing data at the remaining range of LAs;
   mapping the second range of LAs and the redundantly stored data in the first range of LAs in a second map in response to the inoperability;
   utilizing the first map for requests that are directed to the first range of LAs and the remaining range of LAs in response to the inoperability; and
   utilizing the second map for future requests that are directed to the second range of LAs and to the redundantly stored data in the first range of LAs in response to the inoperability.

2. The method according to claim 1, and comprising configuring one or more interfaces to receive input/output (IO) requests from host processor directed to specified LAs and to direct all the IO requests to the caches which have been configured to perform at least one of the operations of retrieving data from and storing data at the specified LAs.

3. The method according to claim 2,
   wherein the one or more interfaces comprise a mapping between the first and the second and the one or more third caches and the first and second ranges of the LAs,
   wherein the one or more interfaces are adapted to convert the IO requests to one or more requests and to direct the one or more requests to at least one of the first and the second and the plurality of caches in response to the mapping, and
   wherein detecting the inability comprises generating a reconfigured mapping between the first and the plurality of caches and the first and second ranges of the LAs, and directing the one or more request to at least one of the first and the one or more third caches in response to the reconfigured mapping.

4. The method according to claim 1, wherein reconfiguring the at least one of the plurality of caches comprises processing data in the at least one of the first cache and the plurality of caches so as to restore the first cache and the plurality of caches to a state of full data redundancy.

5. The method according to claim 4, wherein processing the data comprises classifying data in the first cache into a plurality of data groups.

6. The method according to claim 5, wherein one of the data groups comprises dirty data, and wherein processing the data comprises storing the dirty data at the plurality of caches.

7. The method according to claim 5, wherein one of the data groups comprises dirty data, and wherein processing the data comprises storing the dirty data at the storage device.

8. The method according to claim 1, wherein reconfiguring the at least one of the plurality of caches comprises retaining an initial configuration of the first cache.

9. The method according to claim 1, wherein reconfiguring the at least one of the plurality of caches comprises implementing a minimum redistribution of the first and the second ranges among the first cache and the plurality of caches.

10. The method according to claim 9, wherein implementing the minimum redistribution comprises redistributing the first and the second ranges using a consistent hashing function.

11. The method according to claim 9, wherein implementing the minimum redistribution comprises redistributing the first and the second ranges using a random number function.

12. The method according to claim 1, and comprising providing a system manager which is adapted to configure the first, second and plurality of caches, to detect the inability, and to reconfigure the at least one of the first cache and the plurality of caches.

13. The method according to claim 12, wherein providing the system manager comprises incorporating one or more manager processing units into at least one of the storage device, the first cache, the second cache, and the plurality of caches, and operating the one or more manager processing units in a cooperative manner.

14. The method according to claim 1, wherein the mass storage device comprises one or more disks.

15. A data storage system, comprising:
   a storage device wherein data is stored at logical addresses (LAs);
   a first cache configured to perform at least one of the operations of retrieving data from and storing data at a first range of LAs in the storage device;
   a second cache configured to perform at least one of the operations of retrieving data from and storing data at a second range of LAs and redundantly storing the first range of LAs, the first cache further configured to redundantly store the second range of LAs;
   a plurality of remaining caches configured to perform at least one of the operations of retrieving data from and storing data at a remaining range of LAs in the storage device, and redundantly storing the data in the remaining range of LAs;
   a system manager configured to detect that the second cache is inoperable and reconfigure the remaining plurality of caches to perform at least one of the operations of retrieving data from and storing data at the first range of LAs and redundantly storing the data in the second range of LAs in response to the inoperable detection; and
   a memory device configured to store:
      a first map for mapping the first range of LAs, the second range of LAs, the remaining range of LAs, and the redundancy data for the first range of LAs, the second range of LAs, the remaining range of LAs prior to detecting the inoperability of the second cache, and a second map for mapping the second range of LAs and the redundancy data for the first range of LAs in response to the inoperability of the second cache, wherein:

the system manager is further configured to utilize the first map for requests that are directed to the first range of LAs and the remaining range of LAs in response to the inoperability, and utilize the second map for future requests that are directed to the second range of LAs and to the redundantly stored data in the first range of LAs in response to the inoperability.

16. The storage system according to claim 15, and comprising one or more interfaces which are configured to receive input/output (IO) requests from host processors directed to specified LAs and to direct all the IO requests to the caches which have been configured to perform at least one of the operations of retrieving data from and storing data at the specified LAs.

17. The storage system according to claim 16,
wherein the one or more interfaces comprise a mapping between the first and the second and the plurality of remaining caches and the first and second ranges of the LAs,
wherein the one or more interfaces are adapted to convert the IO requests to one or more requests and to direct the one or more requests to at least one of the first and the second and the plurality of remaining caches in response to the mapping, and
wherein detecting the inability comprises the system manager generating a reconfigured mapping between the first and the plurality of remaining caches and the first and second ranges of the LAs, and directing the one or more requests to at least one of the first and the plurality of remaining caches in response to the reconfigured mapping.

18. The storage system according to claim 15, wherein reconfiguring the at least one of the plurality of remaining caches comprises processing data in at least one of the first cache and the plurality of remaining caches so as to restore the first cache and the plurality of remaining caches to a state of full data redundancy.

19. The storage system according to claim 18, wherein processing the data comprises classifying data in the first cache into a plurality of data groups.

20. The storage system according to claim 19,
wherein one of the data groups comprises dirty data, and
wherein processing the data comprises storing the dirty data at the plurality of remaining caches.

21. The storage system according to claim 19,
wherein one of the data groups comprises dirty data, and
wherein processing the data comprises storing the dirty data at the storage device.

22. The storage system according to claim 15, wherein reconfiguring the at least one of the plurality of remaining caches comprises the first cache retaining an initial configuration.

23. The storage system according to claim 15, wherein reconfiguring the at least one of the plurality of remaining caches comprises the system manager implementing a minimum redistribution of the first and the second ranges among the first cache and the plurality of remaining caches.

24. The storage system according to claim 23, wherein implementing the minimum redistribution comprises redistributing the first and the second ranges using a consistent hashing function.

25. The storage system according to claim 23, wherein implementing the minimum redistribution comprises redistributing the first and the second ranges using a random number function.

26. The storage system according to claim 25, wherein the system manager comprises one or more manager processing units which are incorporated into at least one of the storage device, the first cache, the second cache, and the plurality of remaining caches, and wherein the one or more manager processing units operate in a cooperative manner.

27. The storage system according to claim 15, wherein the mass storage device comprises one or more disks.

* * * * *